United States Patent [19]
Knupp

[11] Patent Number: 5,424,958
[45] Date of Patent: * Jun. 13, 1995

[54] REAL TIME RESOURCE ALLOCATION

[75] Inventor: Stephen L. Knupp, Wilmington, Del.

[73] Assignee: Honeywell Inc, Minneapolis, Minn.

[*] Notice: The portion of the term of this patent subsequent to Jan. 11, 2011 has been disclaimed.

[21] Appl. No.: 125,450

[22] Filed: Sep. 22, 1993

[51] Int. Cl.⁶ .................... H02J 11/00; G05B 13/02
[52] U.S. Cl. ..................... 364/493; 364/156; 364/492; 364/431.01; 307/97; 307/153
[58] Field of Search ............... 364/492, 602, 493, 156, 364/431.01; 307/34, 97, 69, 153

[56] References Cited

U.S. PATENT DOCUMENTS

| | | | |
|---|---|---|---|
| 3,863,270 | 1/1975 | Haley et al. | 364/602 |
| 4,100,428 | 7/1978 | Delisle et al. | 307/34 |
| 4,686,630 | 8/1987 | Marsland et al. | 364/492 |
| 5,278,772 | 1/1994 | Knupp | 364/492 |

Primary Examiner—Emanuel T. Voeltz
Assistant Examiner—Alan Tran
Attorney, Agent, or Firm—Arthur A. Sapelli; William Udseth

[57] ABSTRACT

The method allocates a demanded amount of power to a plurality of power output apparatus, each power apparatus having characteristic curves associated therewith, and the total power outputted from the plurality of power apparatus results in a minimum cost for generating the power. Each boiler is allocated a quantity of waste fuel to be used in the generation of power, the quantity of waste fuel to be a predetermined total over a predetermined time period. Data is entered for each of the power apparatus into a controller. Optimal solutions are generated for all valid possible output power demands using an optimization by parts technique within bounds of each power apparatus. The solutions indicate the portion of power each power apparatus is to supply to provide the total power demanded at minimal cost. The solutions are stored in tables within a storage unit of the controller. Upon receipt of a demand for power, a search is performed of the solution tables to obtain the amount of power each power apparatus is to supply and the amount of waste fuel to use. Control signals are then outputted to each power apparatus, the control signals being indicative of the amount of power to be supplied and the waste fuel to utilize.

10 Claims, 9 Drawing Sheets

Fig. 5

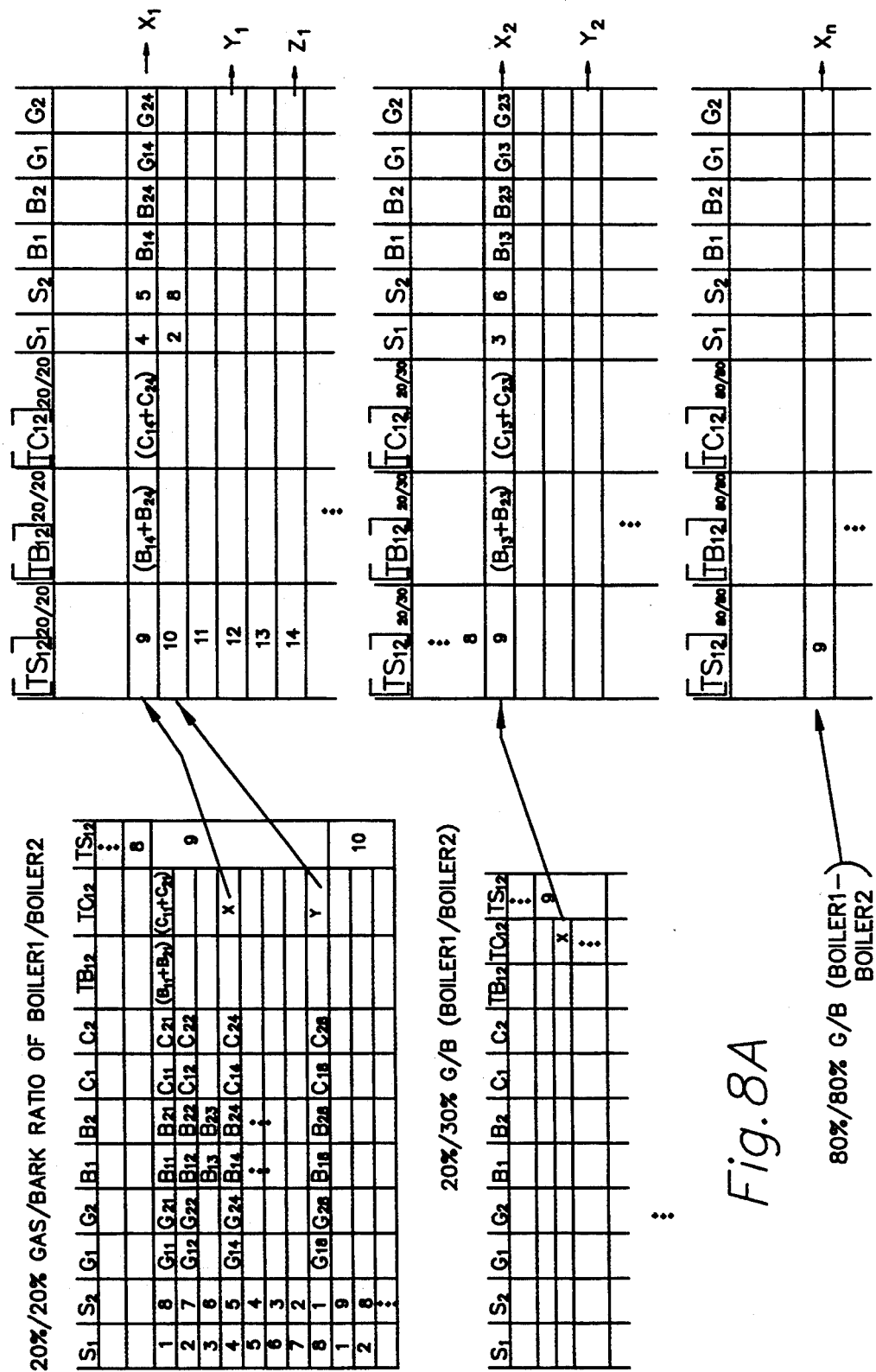

| TS$_{12}$ | TB$_{12}$ | TC$_{12}$ | S$_1$ | S$_2$ | B$_1$ | B$_2$ | G$_1$ | G$_2$ | |
|---|---|---|---|---|---|---|---|---|---|
| 9 | $X_1 = (B_{14}+B_{24})$ | $(C_{14}+C_{24})$ | 4 | 5 | B$_{14}$ | B$_{24}$ | G$_{14}$ | G$_{24}$ | ⎫ 1ST & 4TH TIME INTERVAL |
|   | $X_2 = (B_{13}+B_{23})$ | $(C_{13}+C_{23})$ | 3 | 6 | B$_{13}$ | B$_{23}$ | G$_{13}$ | G$_{23}$ | |
|   | $X_3 =$ | | | | | | | | |
|   | $X_4 =$ | $(C_{19}+C_{29})$ | 6 | 3 | B$_{19}$ | B$_{29}$ | G$_{19}$ | G$_{29}$ | |
|   | $X_5 =$ | | | | | | | | |
|   | $X_n$ | | | | | | | | |
| 12 | $Y_1 =$ | | | | | | | | ⎫ 2ND TIME INTERVAL |
|   | $Y_2 =$ | | | | | | | | |
|   | $Y_3 =$ | | | | | | | | |
| 14 | $Z_1 =$ | | | | | | | | ⎫ 3RD TIME INTERVAL |
|   | $Z_2 =$ | | | | | | | | |
|   | $Z_3 =$ | | | | | | | | |

Fig. 8C 5,424,958

REAL TIME RESOURCE ALLOCATION

RELATED APPLICATIONS

The present application is related to patent application, Ser. No. 07/879,645, entitled "Real Time Economic Load Allocation", by S. L. Knupp, filed 06 May 1992, and to patent application, Ser. No. 08/725,443, entitled "Real Time Environmental Load Allocation", by S. L. Knupp, filed on even date herewith, and to patent application, Ser. No. 08/725,625, entitled "Real Time Load Allocation with Additional Constraints", by S. L. Knupp, filed on even date herewith, all of the above assigned to Honeywell Inc., the assignee of the present application.

BACKGROUND OF THE INVENTION

The present invention relates to a method of control, and more particularly, to a method of real time control of a plurality of power output apparatus for providing a demanded quantity of desired output power at optimal cost versus the fuels used, the fuel including waste fuels.

There is a type of boiler used for the generation of steam called a "hog fuel boiler" which burns items for fuel such as bark, peanut shells, and sometimes used in conjunction with gas or other common fuels to insure that the total fuel mixtures burns better. Oftentimes however, plants have bark stored in storage yards, and a steady influx of bark to the plant. Also bark is being drawn from the stock pile and fed into the furnaces of the boilers.

Presently, the bark is being burned at a predetermined rate, using gas to make up the difference of fuel required to maintain a predetermined steam load.

Generally, it is known what the steam demand is going to be over a period of time (e.g., through the day) or is readily predictable. There is provided by the present invention a method for optimizing cost versus the amount of fuel used over a period of time based on expected steam demand, given that a predetermined amount of bark (i.e., waste fuel) is desired to be burned over the time period.

Thus there is provided by the present invention a method for determining the allocation of waste fuel (bark) supplied to the boilers for predetermined time intervals over the total time period.

SUMMARY OF THE INVENTION

Therefore, there is provided by the present invention, a method of real time resource allocation. The method of the present invention allocates a demanded amount of power to a plurality of power output apparatus, each power output apparatus having characteristic curves associated therewith, such that each of the power output apparatus supplies a portion of the demanded power, and the total power outputted from the plurality of power output apparatus results in a minimum cost for generating the power, and further wherein each boiler is allocated a quantity of waste fuel to be used in the generation of the demanded amount of power, the quantity of waste fuel utilized by all the power output apparatus over a predetermined time period being a predetermined total quantity of waste fuel. Data is entered for each of the power output apparatus into a controller. Optimal solutions are generated for all valid possible output power bounds of each of the power output apparatus. The solutions indicate the portion of power each power output apparatus is to supply to provide the total power demanded at minimal cost, and also indicate waste fuel, fuel, waste fuel to fuel ratio, to be utilized during a predetermined plurality of time intervals within the predetermined time period. The solutions are stored in tables within a storage unit of the controller. Upon receipt of a demand for power, a search is performed of the solution tables to obtain the amount of power each power output apparatus is to supply at minimal cost, and to obtain the fuel and waste fuel each power output apparatus is to utilize to meet the power demand. Control signals are then outputted to each of the power output apparatus, the control signals being indicative of the amount of power to be supplied with the total amount of waste fuel utilized over the time period being the predetermined total quantity of waste fuel.

Accordingly, it is an object of the present invention to provide a method for making a real time resource allocation to power output apparatus.

It is another object of the present invention to provide a method for allocating a portion of a predetermined resource to each of the power output apparatus such that the total combined power output from each of the power output apparatus meets the demanded power output, a predetermined amount of the total resource is utilized, and the total cost of the power output apparatus is minimized.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 4, which comprises

FIG. 5 shows an example of the generation of the boiler 5/6 optimal cost/emissions combination solution table based on steam load, which is depicted in the optimal cost curve of FIG. 4E;

FIG. 8, which comprises FIGS. 8A–8C there is shown a family of tables generated in the optimization by parts process for an example of optimizing a two boiler system in accordance with the method of the preferred embodiment of the present invention.

DETAILED DESCRIPTION

Figure 1:
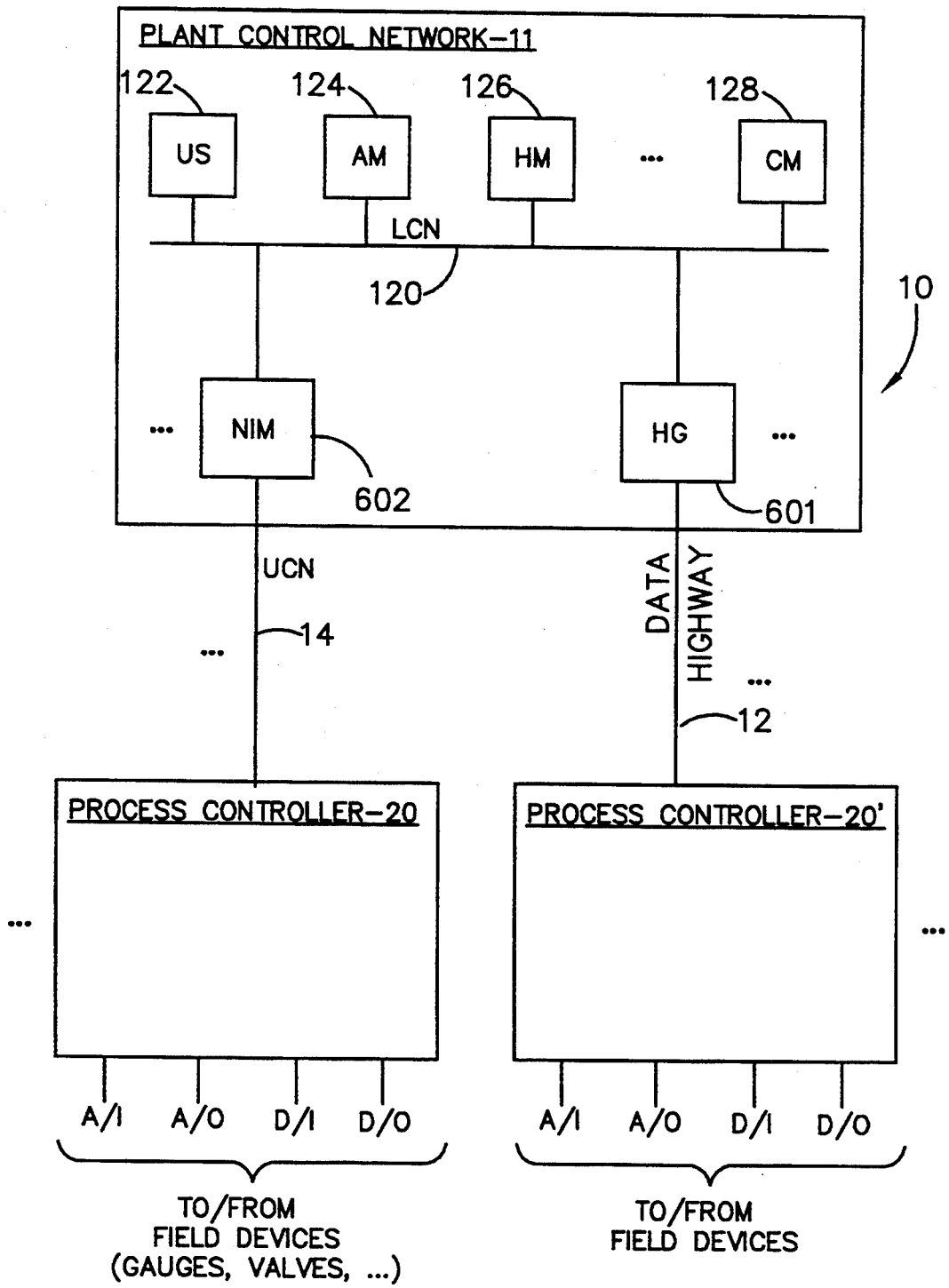
FIG. 1 shows a block diagram of the preferred embodiment of the process control system in which the present invention is utilized.

Before describing the method of the present invention, it will be helpful in understanding a process control system, and in particular, the process control system of the preferred embodiment in which the method of the present invention can be utilized. Referring to FIG. 1, there is shown a block diagram of a process control system 10. The process control system 10 includes a plant control network 11, and connected thereto is a data highway 12, which permits a process controller 20' to be connected thereto. In the present day process control system 10, additional process controller 20' can be operatively connected to the plant control network 11 via a corresponding highway gateway 601 and a corresponding data highway 12. A process controller 20, is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controllers 20, 20' interface the analog input and output signals, and digital input and output signals (A/I, A/O, D/I, and D/O, respectively) to the process control system 10 from the variety of field devices (not shown) which include valves, pressure switches, pressure gauges, thermocouples, . . . .

The plant control network 11 provides the overall supervision of the controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/supervisory function of the process being controlled. Each of these physical modules includes a microprocessor and is operatively connected to a local control network (LCN) 120 which permits each of these modules to communicate with each other as necessary in accordance with a predetermined protocol. The NIM 602 and HG 601 provide an interface between the LCN 120 and the UCN 14, and the LCN 120 and the data highway 12, respectively. A more complete description of the plant control network 11, and the physical modules can be had by reference to U.S. Pat. No. 4,607,256, and a more complete description of the process controller 20' can be had by reference to U.S. Pat. No. 4,296,464. The process controller 20, provides similar functions to that of process controller 20' but contains many improvements and enhancements.

In the preferred embodiment of the present invention, it is desired to control a plurality of boilers (not shown) which outputs power (steam) for the process being controlled, and more specifically, it is desired to allocate the amount of steam each boiler is to supply such that the total emissions from all the boilers is minimized. The function of allocating (i.e., the real time load allocator) of the preferred embodiment of the present invention is performed by the application module (AM) 124, although it will be understood by those skilled in the art that the function can be performed by other modules of the process control system 10, including the process controller 20.

The method of the control utilized within the process control system of the preferred embodiment will now be described. For purposes of example, the process includes six (6) boilers which are to be included in supplying steam to the process. All boilers have different emissions curves due to the variety of fuels available, different operating efficiency curves, . . . . Each boiler has associated therewith a curve of steam vs fuels, steam vs emissions, a curve for each type of emission, e.g., Nitrogen Oxides ($NO_x$) vs. steam, Sulphur Oxides ($SO_x$) vs. steam, carbon monoxide (CO) vs. steam, . . . .

Figure 2:
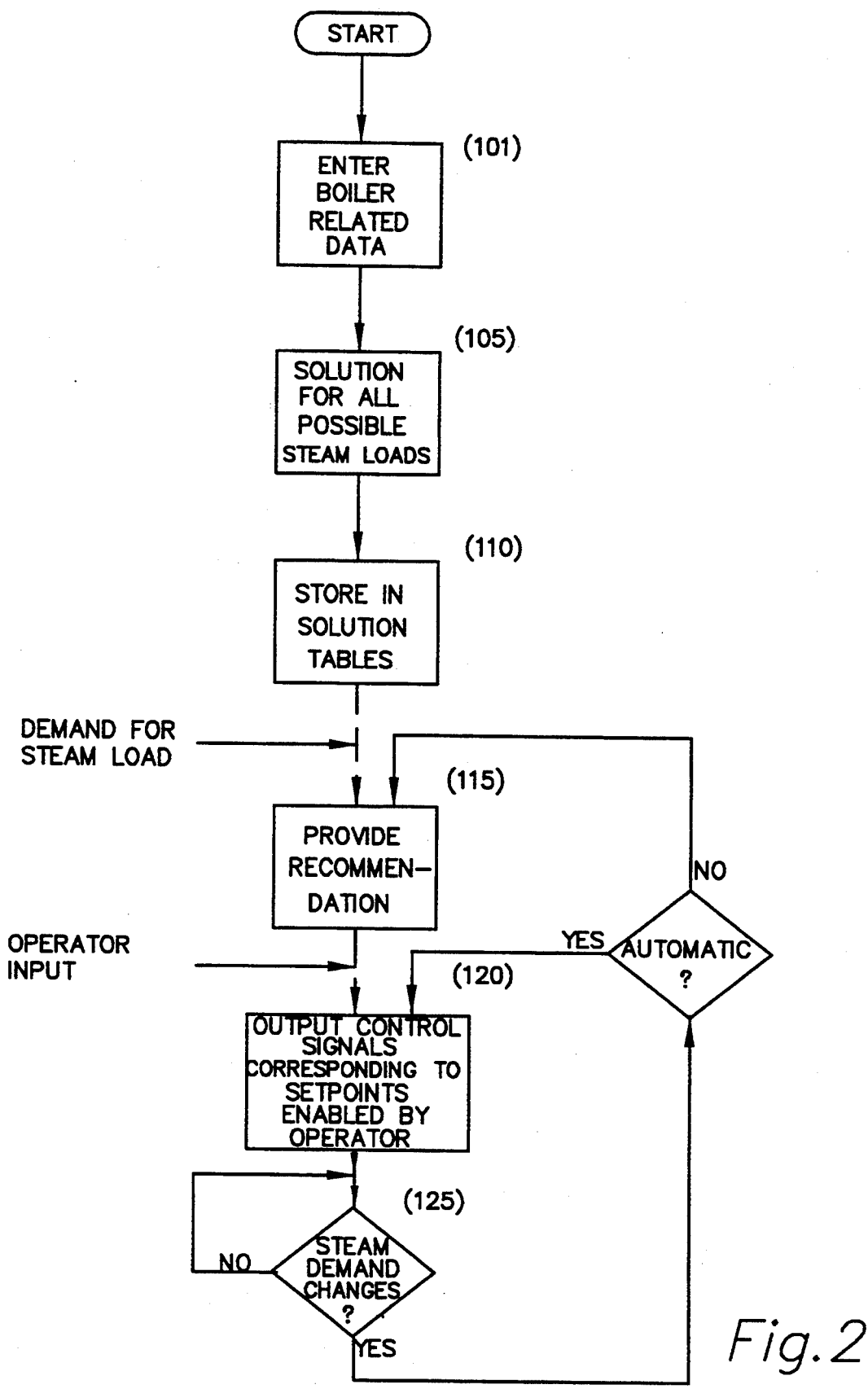
FIG. 2 shows a flow diagram outlining the setup and overall implementation of the method of the present invention.

Referring to FIG. 2, there is shown a flow diagram outlining the setup and overall implementation of the method of the present invention. In the preferred embodiment of the present invention, a user enters the type of fuel for each boiler, fuel cost, boiler range, emissions data, total time period, time intervals of the total time period, total amount of waste fuel to be utilized, expected (predicted) steam load for each time interval, and efficiency parameters into the application module 124 as numeric points (block 101). This information essentially makes up the data (or cost, emissions, . . .) curves, sometimes referred to as characterization data, referred to above. After the parameters are entered the present invention performs a setup procedure and solves for all possible solutions of interest, in this example, costs are to be minimized for a demanded steam load and also subject to utilizing a predetermined amount of waste fuel (bark in the example desired herein) i.e., multiple constraints. Solutions for the special cases such as offline boilers (block 105) are also performed. These solutions are stored in solution tables which are used to provide instant recommendations for any steam load demands (block 110). In the preferred embodiment, steam is known (or predicted) over each time interval of a total time period. If any of the critical parameters such as the operating efficiency curves, emissions curves, or fuel costs are changed, a new setup is performed and new tables created. Typically the setup procedure is completed within several minutes of processing time in the preferred embodiment of the present invention. The application module, i.e., the process control system 10, is ready for the process control function. Upon receiving a demand for a steam load, the present invention searches the solution tables and provides instantaneous recommendations to load each boiler for the current steam demand (block 115) and recommendation regarding the bark allocation for each boiler and which results in maximizing cost efficiency and achieving the desired amount of waste fuel utilization, in this example the bark usage. When the operator input is received enabling the optimal loading solutions (or indicating other loading desired) the information is outputted directly by the process control system or ramped over a relatively small period of time (as compared to the time interval) in response to the operator command. The output of the present invention interfaces directly into traditional controller schemes so that bias loads necessary are provided to minimize costs or directly provide each boiler steam demand set point as is well known by those skilled in the art (block 120). As steam demands change (block 125) (at each new time interval) new control signals are outputted or if the system is in a nonautomatic mode the recommendations are provided (block 115) and an operator input awaited.

Although not shown, as the steam demand changes, the method of the present invention can provide current solutions on a real-time basis to provide the optimal load distribution and optimal fuel ratios for the current set of boilers, or a second "global solution" is provided which considers boilers that are to be taken off line, or placed on line. The method of the present invention determines the effects of shutting down boilers during periods of minimum demand while maintaining the required excess capacity to meet changes in the steam demand. This provides a tremendous cost savings during partial plant shutdowns. In addition the method of the present invention can determine the optimum steam load for maintenance for plant shutdowns. When a boiler is shutdown, a partial setup procedure is executed and the solution tables modified to reflect a loss of the boiler and the effects of losing an additional boiler. When the steam demand increases above the excess capacity set point, the method of the present invention will automatically recommend that the offline boiler be restarted to meet the new demand. The setup procedure is then executed and a new set of solution tables is calculated. The local optimization (maximization/minimization) is calculated, i.e., solutions where the same number of boilers is maintained. The global solution examines all possible distributions of the steam rate across all available boilers (except those designated as being offline for maintenance) and determines the best set of boilers to use for steam production. Note that optimization as used herein expresses minimum/maximum which can be determined from the context.

The method of high speed optimization/minimization technique utilizes a Method of Optimization by Parts which guarantees that the optimal dependent variable parameter (cost) loading is always determined. Since the performance curve representing boilers are not limited to straight lines (as in the case with some types of optimization, the results of the present invention are extremely accurate). The performance curves (sometimes referred to as characterization curves) can be of any type of algebraic equation including high order polynomials.

Referring to FIG. 3, there is shown typical characterization curves for each boiler, FIG. 3 including FIGS. 3A–3E. These curves have different parameters and constraints where parameter = f (constraint).

Figure 3A:
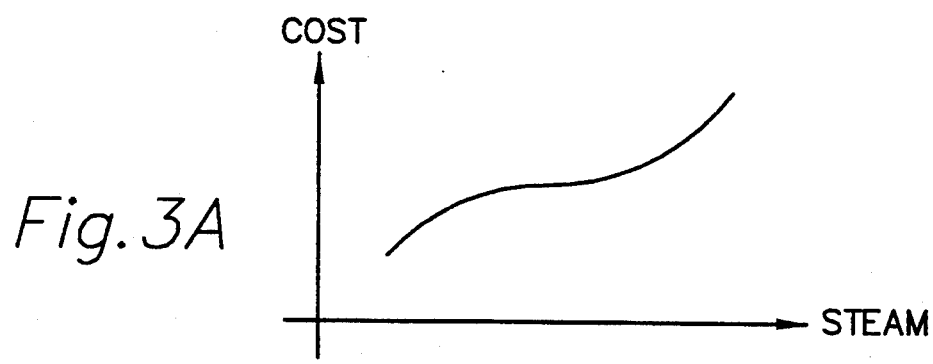
FIG. 3 shows typical characterization curves for a boiler.
Figure 3B:
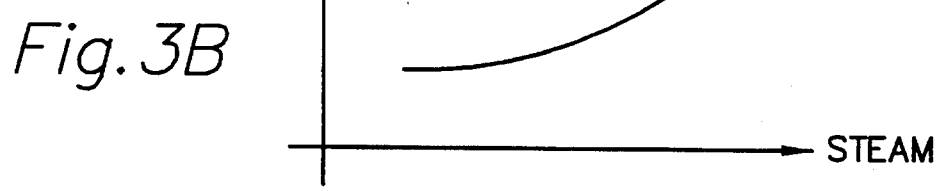
Figure 3C:
Figure 3D:
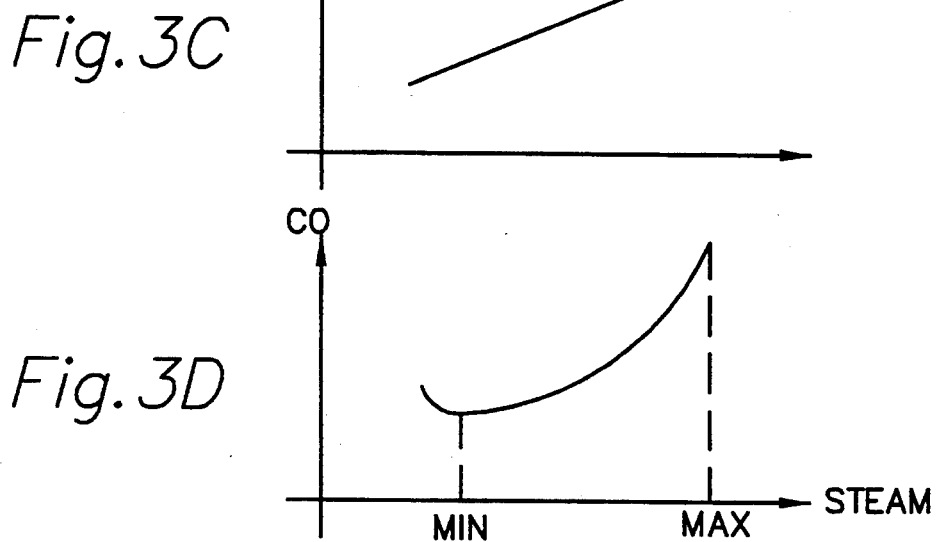
Figure 3E:
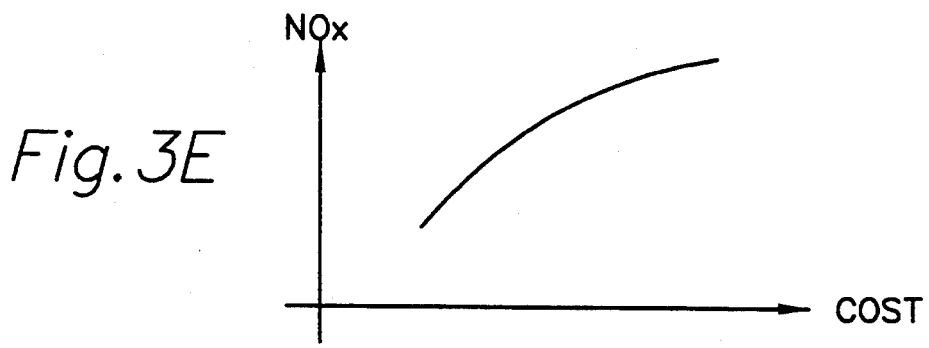

It should be noted that sometimes a variable can be a parameter (such as cost in FIG. 3A) and sometimes that same variable can be a constraint (cost in FIG. 3E). In the present invention it is desired to optimize the parameter having a plurality of constraints. Thus, for example, it may be desired to output a predetermined steam load at a minimum cost, and also wherein the allocation of waste fuel to the boiler for predetermined time intervals over a total time period is made such that a total predetermined amount of waste fuel is consumed over the time period. Additional constraints can include the emission output of the boilers, wherein the emission output of Nitrogen Oxides ($NO_x$) are at or less than a predetermined value, and also wherein the emissions output of Sulphur Oxides ($SO_x$) are at or less than a predetermined number, and also wherein the emission output of carbon monoxide (CO) is at or less than a predetermined number. All these can be included as constraints to the parameter, i.e., cost.

Before discussing the resource loading of the present invention, it will be helpful to discuss the determination of optimal loading of the boilers to meet a predetermined total steam load and a predetermined $NO_x$ emissions output resulting in a minimum cost, for example. Thus, it is desired in the example to minimize the cost such that the total emissions of nitrogen oxides, TN, from all the boilers, n, is at or below a predetermined level and is also subject to the total steam demand (TS), where the total steam is the sum of the steam outputted from all the boilers n.

For purposes of example only, a system having six (6) boiler will be discussed. As mentioned above, each boiler has its own characteristics resulting in a unique cost (or efficiency) curve and emissions curve, or more specifically, cost versus steam curve, and $NO_x$ emissions versus steam curve. The optimization by parts method combines the cost and $NO_x$ emissions curves of each of the boilers to obtain an optimal cost curve as a function of the constraints for the combination of all the boilers. The method of optimization by parts combines two (2) boilers in this example, then combines that combination with another boiler, then combines that combination with yet another boiler, until all the boilers are combined. The total boilers can be expressed as a function of the total steam or f(T) where $$\begin{aligned} f(T) &= G\,[(X_1, N_1), (X_2, N_2), (X_3, N_3), \\ &\quad (X_4, N_4), (X_5, N_5), (X_6, N_6)] \\ &= G_1\,(X_1, N_1) + G_2\,(X_2, N_2) + G_3\,(X_3, N_3) + \\ &\quad G_4\,(X_4, N_4) + G_5\,(X_5, N_5) + G_6\,(X_6, N_6) \end{aligned}$$

where T = total steam,
Xn = steam for the boiler n, and
$N_1 \leq X_1 \leq M_1$
$N_2 \leq X_2 \leq M_2$
$N_3 \leq X_3 \leq M_3$
$N_4 \leq X_4 \leq M_4$
$N_5 \leq X_5 \leq M_5$
$N_6 \leq X_6 \leq M_6$
$N_1, \ldots N_6$ are known, $M_1 \ldots M_6$ are known, and T (the total steam) equals $X_1 + X_2 + X_3 + X_4 + X_5 + X_6$. In addition, $T_{min} = N_1 + N_2 + N_3 + N_4 + N_5 + N_6$ $T_{max} = M_1 + M_2 + M_3 + M_4 + M_5 + M_6.$ The functions $G_1 \ldots G_6$ are of any algebraic order or form. Typically boilers are expressed as $G_n(X_n) = A_n X^3_n - B_n X^2_n + C_n X_n - D_n$ $T_{min}$ (the minimum total steam)

$T_{max}$ (the maximum total steam)

The optimization used in the Method of Optimization by Parts optimizes the f(T) in accordance with the expression $$\begin{aligned} OPT\,[f(T)] &= OPT\,[G_1(X_1, N_1) + OPT\,[G_2(X_2, N_2) + \\ &\quad OPT\,[G_3(G_3, N_3) + OPT\,[G_4(X_4, N_4) + \\ &\quad OPT\,[G_5(X_5, N_5) + G_6(X_6, N_6)]]]]]. \end{aligned}$$

OPT = optimize

The technique (or algorithm) of the present invention defines a new variable $S_{56} = X_5, N_5 + X_6, N_6$ $S_{56m} = M_5 + M_6$ and $$S_{56n} = N_5 + N_6.$$

It is now desired to combine or optimize the boilers 5 and 6 in accordance with the following expression. All combinations are iterated for $S_{56}$ from $S_{56n}$ to $S_{56m}$ to obtain a new function $f_{56}(S_{56})$. That results in an optimal cost curve as a function of steam load and emissions for the combination of 5/6 boiler. Next, $G_4(X_4, N_4)$ is optimized with the 5/6 boiler combination $$S_{456} = (X_4, N_4) + S_{56}$$

$$S_{456m} = M_4 + M_{56m}$$

Figure 4A:
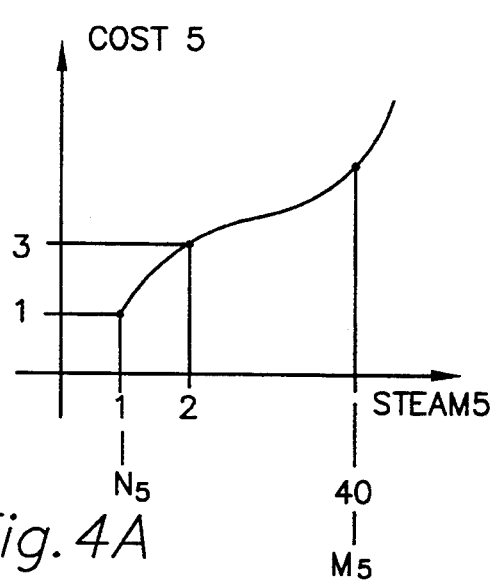
FIGS. 4A–4E, shows examples of emissions curves and cost curves for boilers 5 and 6 of an example, and an optimal cost curve as a function of two constraints utilized in the example for the combination 5/6 boiler.
Figure 4B:
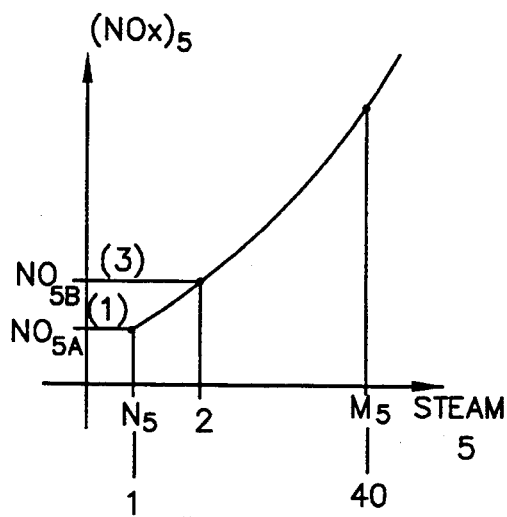
Figure 4C:
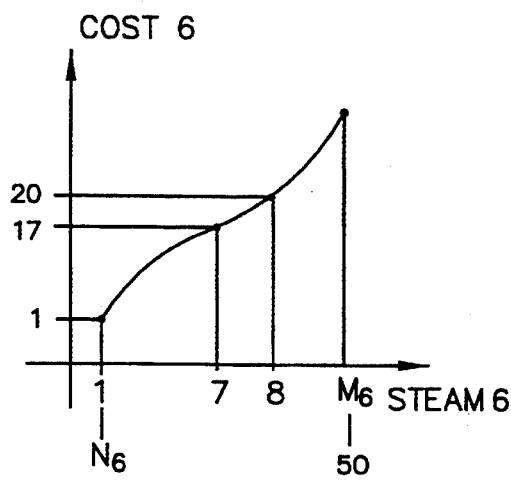
Figure 4D:
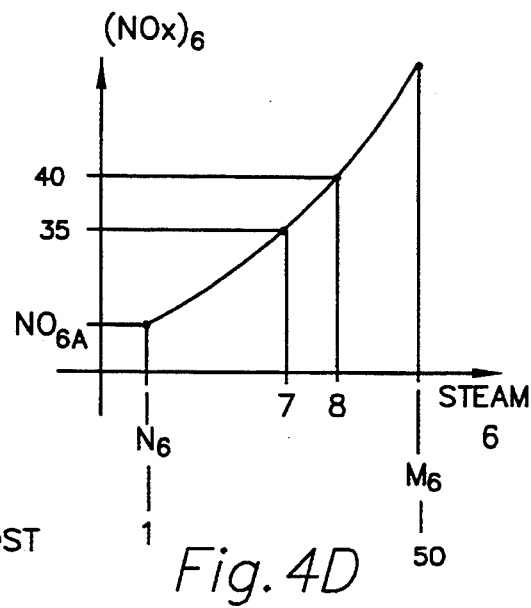
Figure 4E:
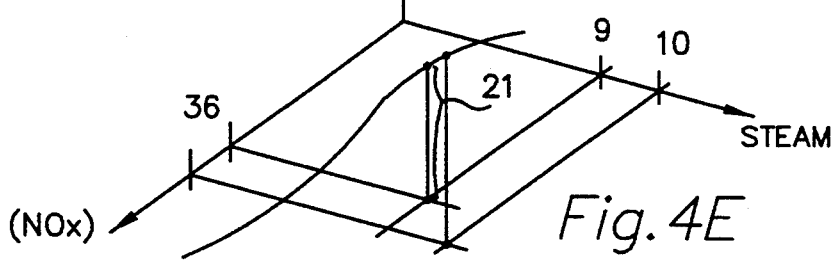

This results in combining boiler 4 with the combination of the 5/6 boilers to obtain a new optimal cost curve. This continues until all the boilers have been combined as follows $$f_{456}(S_{456}) = OPT[G_4(X_4, N_4) + f_{56}(S_{56})];$$

$$f_{3456}(S_{3456}) = OPT[G_3(X_3, N_3) + f_{456}(S_{456})];$$

$$f_{23456}(S_{23456}) = OPT[G_2(X_2, N_2) + f_{3456}(S_{3456})]; \text{ and}$$

$$f_{123456}(S_{123456}) = OPT[G_1(X_1, N_1) + f_{23456}(S_{23456})];$$

and results in five (5) solution tables which are
$T_{123456}$
$T_{23456}$
$T_{3456}$
$T_{456}$
$T_{56}$ Referring to FIG. 4 which comprises FIGS. 4A–4E, there is shown cost and emissions curves for boilers 5 and 6. FIGS. 4A and 4B show a cost and emission curve for boiler 5, respectively, and FIGS. 4C and 4D show a cost and emissions curve for boiler 6, respectively and FIG. 4E shows a combined curve for the combination of boilers 5/6 in accordance with the algorithm described above. Boiler 5 in this example can output no lower than 1 pound of steam and no more than 40 pounds of steam, $N_5$ and $M_5$, respectively. A emissions output of operating the boiler 5 having an output of 1 pound of steam is $NO_{5A}(=1)$. Similarly, for outputting 2 pounds of steam the emissions output of operating boiler 5 is $NO_{5B}(=3)$, and so on. FIG. 4D shows the emissions output with respect to the output steam production from boiler 6. In this example boiler 6 can output no less than 1 pound of steam and no more than 50 pounds of steam ($N_6$ and $M_6$, respectively). When boiler 6 operates to output 1 pound of steam the emissions output associated with operating boiler 6 is $NO_{6A}$. The optimization by parts method combines the cost and emissions curve of boiler 5 and boiler 6 to arrive at an optimally combined cost curve $T_{56}$ shown in FIG. 4E.

Figure 5:
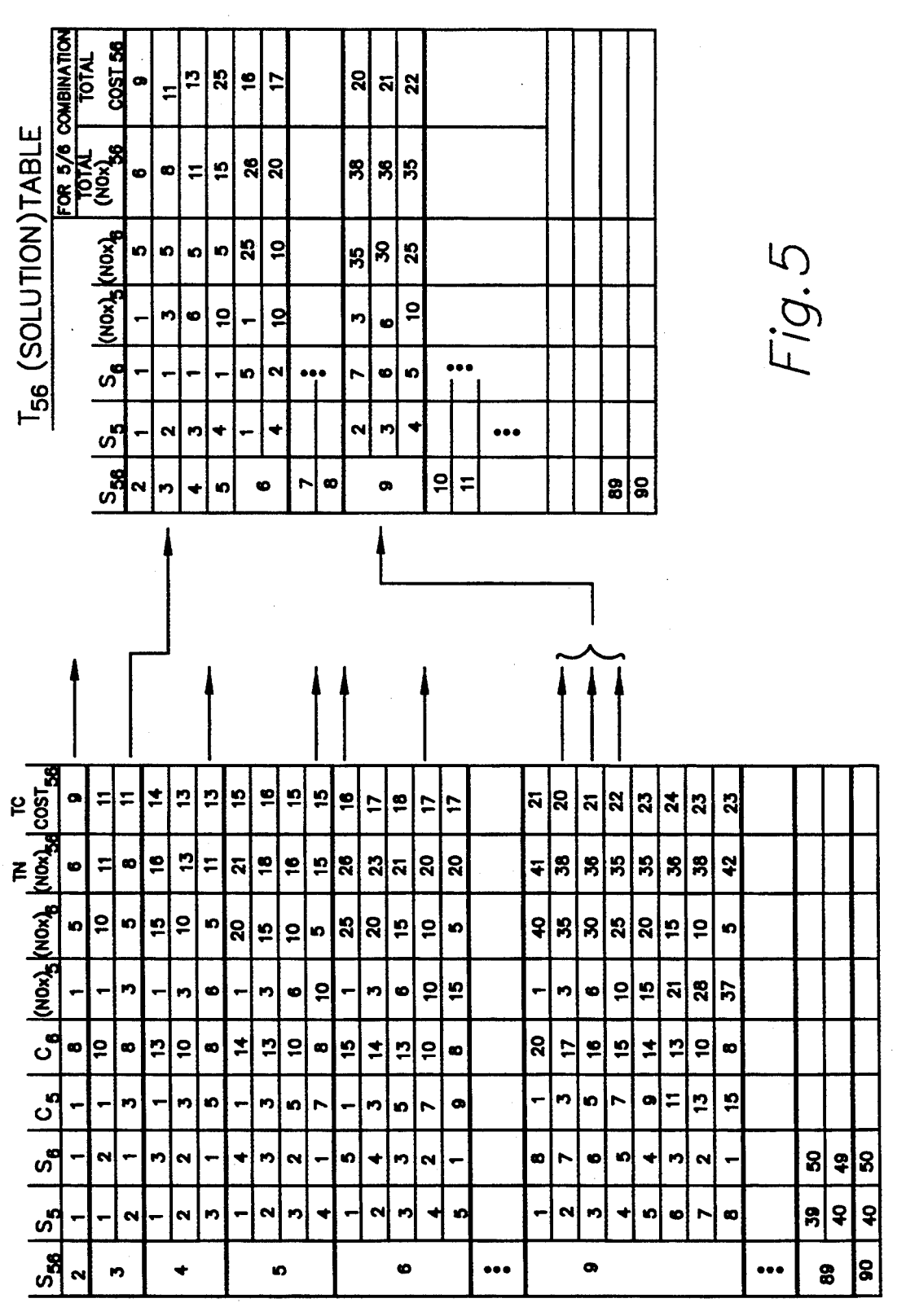

The curve is derived by a combination shown in the example of FIG. 5. Referring to FIG. 4, the (points of the) combination curve is shown. The minimum that the combination can output is 2 pounds of steam, thus, the column $S_{56}$ outputs 2 pounds of steam, and the only combination available is $S_5$ outputting 1 pound of steam and boiler 6 outputting 1 pound of steam. The emissions associated with the respective boilers are added to derive a total emissions, i.e., $NO_{5A} + NO_{6A} = NO_{56A}$. That results in a single point on the $T_{56}$ emissions curve and is shown in the $T_{56}$ table, or solution table $T_{56}$. Also the costs for boiler 5 ($C_5$) and boiler 6 ($C_6$) are added to derive the total costs ($C_{56}$). To output 3 pounds of steam from the combination, boiler 5 can output 2 pounds of steam in which case boiler 6 outputs 1 pound of steam or boiler 6 outputs 2 pounds of steam and boiler 5 outputs 1 pound of steam. No other combination is realizable given the minimum output of both boilers and the desired output, that is 3 pounds of steam. The emissions associated with boiler 5 running at 2 pounds of steam is $NO_{5B}$ and the emissions associated with running boiler 6 at 1 pound of steam is $NO_{6A}$, the sum being the total emissions which is $NO_{56B}$. The other alternative is when boiler 5 is outputting 1 pound of steam and boiler 6 is outputting 2 pounds resulting in the desired output total of 3 pounds of steam. The emissions associated with running boiler 5 with this specified output is $NO_{5A}$ and the emissions associated with operating boiler 6 at 2 pounds of steam is $NO_{6B}$, resulting in a total emissions of $NO_{56B}$. Also the total costs are calculated by adding the cost for boiler 5 ($C_5$) and the cost for boiler 6 ($C_6$). Since the total cost for the two combinations are equal in this case, the total emissions for 3 pounds output of steam are examined, i.e., $NO_{56B}$ is compared with $NO_{56B}$, and the lowest value selected and thus form the next point in the $T_{56}$ table. Thus the second data line of the $T_{56}$ table contains the point $S_{56}$ at 3 pounds of total steam output from the boiler 5 and 6 combination, the total cost being 11, and the total emissions being $NO_{56B}$, or 8. The individual values of steam between $S_5$ and $S_6$ and the individual values of $NO_x$ emission, are also kept in the $T_{56}$ table. The process continues for the next point or 4 pounds of output from the combination the lowest cost and lowest emissions of the three forms the data point of information stored in the $T_{56}$ table and continues until the total combinations are performed. The solutions stored in the $T_{56}$ table include (for the same $S_{56}$ value) the lowest cost result and solutions where the cost may be higher but $NO_x$ emission is lower. The total output from the combinations can only be 90 pounds, i.e., $M_5$ and $M_6$, or $40 + 50 = 90$. Once all the points are determined the $T_{56}$ cost curve is completed. Then the $T_{56}$ cost curve is combined with the cost curve for boiler 4 resulting in the $T_{456}$ cost curve or $T_{456}$ solution table. This combination is then combined with boiler 3, then is combined with boiler 2, then is combined with boiler 1, such that a total combination of boilers 1–6 is performed, resulting in five solution tables $T_{123456}$, $T_{23456}$, $T_{3456}$, $T_{456}$, and $T_{56}$. Once the total steam demand is known a fast table lookup is performed and the outputs of each individual boilers are determined from the solution tables and outputted (to the operator for a recommendation or automatically to the boilers, as discussed above).

For the data point requiring 9 pounds of steam ($S_{56}$), the steam from boiler 5 ($S_5$) can be 1, 2, ... 8, and the steam from boiler 6 ($S_6$) can be 8, 7, ... 1, respectively. As discussed above, the total cost TC and total emissions TN are determined. TC for a 2/7 combination of $S_5/S_6$ is 20, the lowest cost. Even though the $NO_x$ emission is higher, this value is stored in the solution table since it is the lowest cost. The 3/6 combination for the $S_5/S_6$ output has TC=21. So too does the 1/8 combination of $S_5/S_6$ output; however, the TN for the latter is 41 while TN for the former is 36. Thus the 3/6 combination is selected as a data point for the $T_{56}$ solution table. Also, the 4/5 combination has a TC of 22, but the $NO_x$ emission is the lowest, therefore meeting the above mentioned criteria, and this solution is saved. All of the other combinations are too high in cost and $NO_x$ emissions. It will be obvious to one skilled in the art that the selection of the data point for the solution table can be given many criteria. The lowest cost can be selected independent of any other factor. In case of a tie, the lowest emissions are selected, and so on.

Referring back to FIG. 4E, the data point of the $T_{56}$ solution table can be seen, 9 pounds of steam yields 36 units of $NO_x$ emissions and costs 21 monetary units. For 10 pounds of steam another point exists which is derived from the $T_{56}$ table. As can be seen, the multiple constraints results in a multi-dimensional table. Two constraints results in a two dimensional table (steam and $NO_x$), three constraints results in a three dimensional table (steam, $NO_x$, and $SO_x$), and so on.

In an alternative approach the optimal emissions curve (or solution table for boilers 2 and 3 can be generated and an optimal solution, optimal emissions curve for boilers 5 and 6 can be generated. Then the boiler 23 combination can be combined with boiler 1 and the boiler 56 combination can be combined with boiler 4 resulting in an $T_{123}$ table and an $T_{456}$ table, respectively. Finally the $T_{123}$ table and the $T_{456}$ table can be combined which results in a total solution of $T_{123456}$ solution table. This approach takes up less memory but requires slightly more processing time. The global tables referred to above would include various combinations eliminating first boiler 1, then boiler 2 . . . . The number of iterations for the method of the present invention as compared with classical methods which require solution of arrays is in the order of 1: 10,000,000 times faster.

Although the example above shows optimizing cost as a function of steam load and $NO_x$ emissions, it will be understood by those skilled in the art that $SO_x$, CO (carbon monoxide), fuel and fuel mixtures, . . . can be additional constraints to optimizing the cost. The parameter being optimized (the dependent parameter) has multiple constraints, i.e., multiple independent parameters, steam and $NO_x$ emissions in the example described above. It should be noted, that optimized as used herein is used interchangeably with maximized or minimized, it's meaning being derived from the context, e.g., maximizing efficiency or minimizing emissions is oftentimes stated as optimizing efficiency or optimizing emissions.

Figure 6:
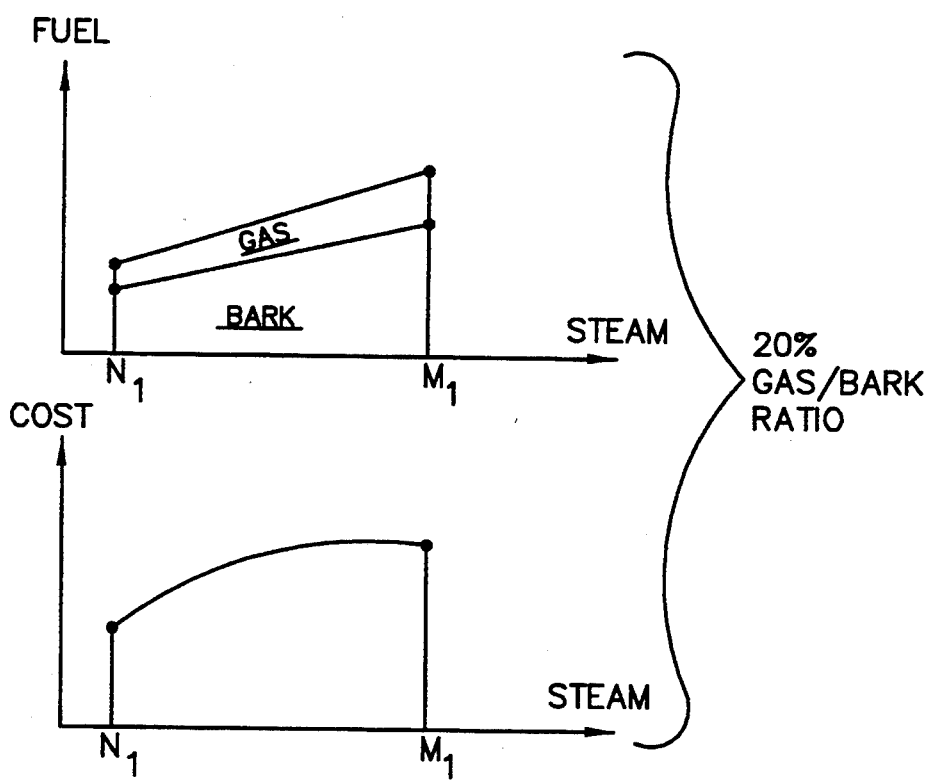
FIG. 6 shows a typical family of curves of fuel vs steam for each hog boiler.
Figure 6:
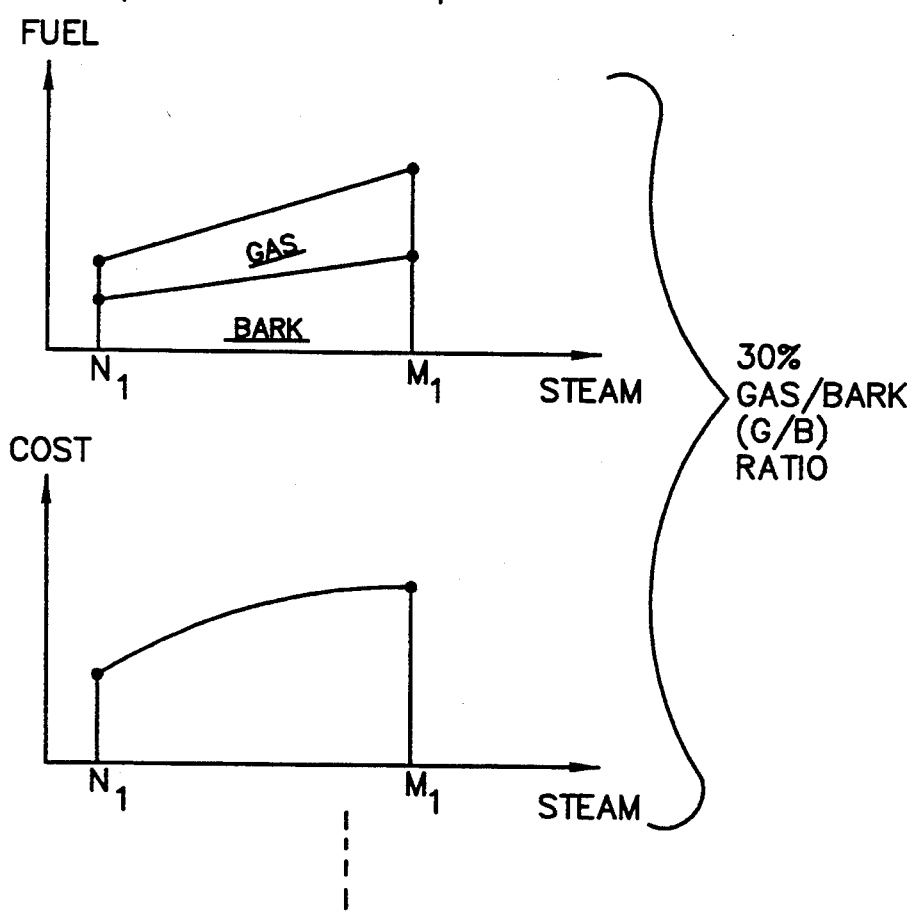

The allocation of resources in accordance with the method of the present invention will now be described. The method utilizes the technique of optimization by parts as described above, fuel (i.e., bark) being a constraint. Referring to FIG. 6, there is shown a typical family of curves of fuel versus steam for each hog boiler. (The cost can be expressed by a normalized number which can be utilized to obtain actual cost by multiplying the ordinate axis by a factor, thereby accounting for changes in fuel costs.) Each curve of the family of curves is a function of the Gas/Bark (G/B) ratio.

Figure 7:
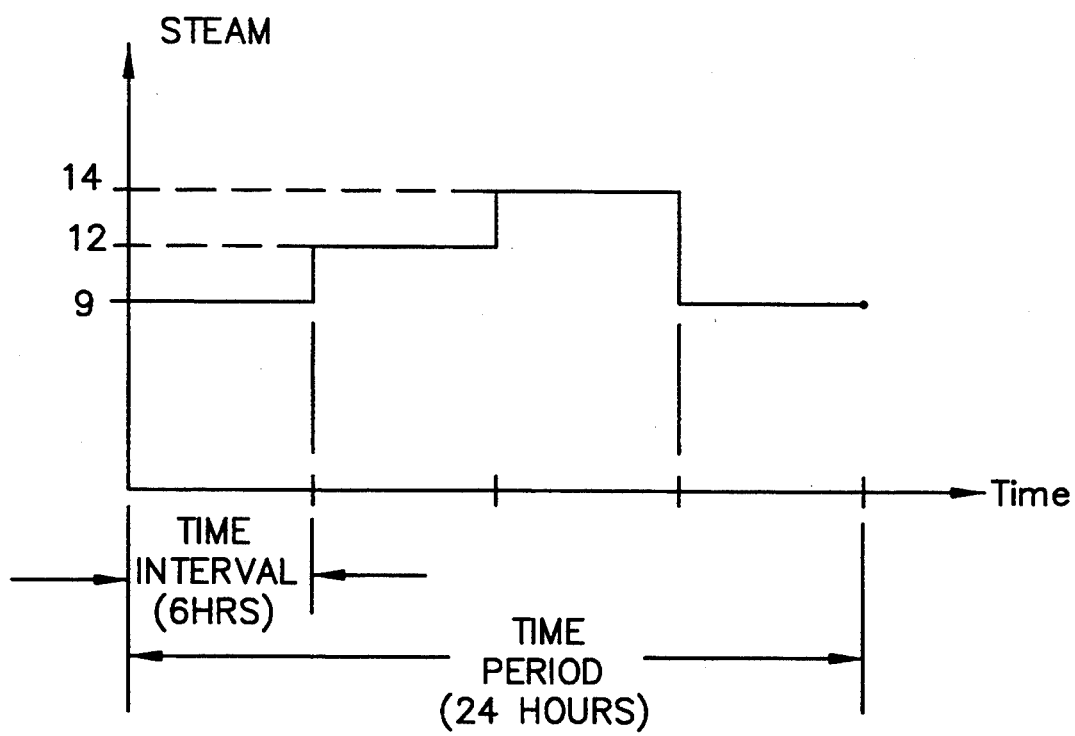
FIG. 7 shows a typical steam load curve during time intervals of a total time period.

In the example below, which implements the method of the preferred embodiment of the present invention, the steam load is known for the total time period, e.g., a day or 24 hour period, which is to vary at various time intervals as shown in FIG. 7. Also, during the total time period a predetermined amount of bark is to be utilized, the total operation being at optimal (lowest) cost.

As described above, a cost curve for a "new" boiler is generated, the "new" boiler being a first and second boiler combination. The example below will assume for example purposes only, that two boilers are used, although it will be understood by those skilled in the art that the method can be expanded to included more boilers in a like manner of the example above.

Referring to FIG. 8, which comprises FIGS. 8A–8C, there is shown a family of tables which optimizes the output of the 1/2 boiler combination in accordance with the given constraints. As in the above example, the characterization data (or curves) of boiler 1 and boiler 2 are combined to yield a characterization curve of a hypothetical "new" boiler 1/2.

The characterization data for the first boiler operating at a 20% gas/bark ratio is combined with the second boiler having a 20% gas/bark ratio. The steam of the respective boilers, S1, S2, may have various combinations to yield a total steam output of the new combined boiler (of 9 pounds of steam), for example. Each boiler utilizes an amount of bark B1, B2 for the respective steam output, and also utilizes a certain amount of gas G1, G2 for that steam output at the G/B ratio. A number of solutions possible to yield a total steam output of 9, given the minimum and maximum amount of steam which each boiler can output, $N_1$, $N_2$, and $M_1$, $M_2$. The total amount of bark, $TB_{12}$ is obtained for each value by adding the respective barks and the total cost is obtained by adding the costs of operating each boiler. The next table of FIG. 8A is obtained by combining the data of boiler 1 and boiler 2 when boiler 1 is operating at a 20% G/B ratio and boiler 2 is operating at a 30% G/B ratio. The data is combined as described above to obtain a table having a 20/30% G/B ratio. The combining continues until all the valid G/B ratios have been obtained for each boiler combination.

After all the tables of FIG. 8A are generated at the various G/B ratios, the tables are combined again by examining the cost for a given steam output and selecting the steam combinations which yield the minimum cost for each G/B ratio, the tables of FIG. 8B. Thus, FIG. 8B shows that for 9 pounds of steam, the fourth combination in the list (marked with an x), is selected (the total cost is the smallest cost for a total steam output of 9 pounds), and is inserted in a table. Similarly, the tables of FIG. 8A is examined for 10 pounds of steam and the item with the least cost (that marked with an Y) is selected and the data inserted into the table of FIG. 8B. Thus the tables of FIG. 8B shows the steam of each individual boiler yielding a single value of a total steam, such that there is only one value for a total of 9 pounds at 20/20% G/B ration, one combination for a total of 10 pounds of steam at 20/20% G/B ration, . . . . Along with the information there is stored the bark for each boiler and the gas for each boiler along with the total bark (TB) and the total cost (TC). When this is completed a similar process is performed on the next table of FIG. 8A which has a 20/30% G/B ratio and a table generated having single values of total steam and the associated data therewith similar to the table above. This operation continues until all the G/B combinations have been performed yielding a table having the total steam vs total bark vs total cost for each G/B ratio. When this is completed a table of FIG. 8C is generated which includes the total steam required during the total time period. Thus each table of FIG. 8B is examined and the data associated with 9 pounds of steam is inserted into the appropriate slot of the table of FIG. 8C. Thus 9 pounds of steam and the associated data therewith is inserted into the X1 position. The associated data associated with 12 pounds of steam is inserted into the Y1 position and the data associated with the 14 pounds of steam inserted into the Z1 position. The next table of FIG. 8B which is for a 20/30% G/B ratio likewise takes the associated data for 9, 12, and 14 pounds of steam and inserts the data into the appropriate slots. Once the table of FIG. 8C is generated the loading of the boilers can then be determined. Given that a total bark burn of 75 tons is to be utilized during the time period, The total bark burn for the total time period will be the bark burn during time interval 1, 2, 3, and 4. Thus the total bark burn will be $$2x_i + Y_j + Z_k.$$

Thus the total bark burn can be determined utilizing the combinations wherein i = 1 to N,
j = 1 to N, and
x = 1 to N.

Let's assume for purposes of example here that $2X_1 + Y_1 + Z_2$ equals 75 tons and the cost associated therewith is 100. Assume another combination $2X_2 + Y_4 + Z_3$ equals 75 ton and the cost associated therewith is 101. Lastly let's assume that one more combination yields a 75 ton total bark burn, namely, where $2X_5 + Y_3 + Z_2$ equals 75 ton and a cost associated therewith of 98. The combination with the lowest cost is the last combination having a cost of 98 and the bark burn for the first and fourth interval will be associated with the values of X5, the values associated with X3 will be utilized during the second time interval, and the values associated with Z2 is associated with the third time interval. Looking backward from the tables the steam of X5 is such that the outputs first boiler will be 6 pounds of steam and the second boiler will be 3 pounds of steam, the bark burn in boiler 1 will be $B_{16}$ and the bark burn in boiler 2 will be $B_{26}$ and the gas of boiler 1 will be $G_{16}$ and the gas burn in boiler 2 will be $G_{26}$. This will result in a total steam output of 9 pounds as required by the steam loading curve of FIG. 7 during the first and fourth interval, and the G/B ratio will be determined by the data of $G_{16}/B_{16}$ and $G_{26}/B_{26}$. For the second time interval the data of $Y_3$ will be utilized to determine the bark burn and the steam output. The total steam output is already know to be 12 pounds of steam and the output from each boiler will be such that the sum is 12 pounds. The data associated with $B_1$ and $B_2$ and $G_1$ and $G_2$ will determine the ratio of the fuel to be burned. At the end of the total time period 75 pounds of bark will be burned and the cost will be the minimal cost to obtain the predetermined steam loading as shown in FIG. 7 in this example and the total bark burn will be the 75 tons as one of the given constraints.

If a third boiler is used then the curves (tables) of FIG. 8 would be expanded such that boiler 1 and boiler 2 is combined as per the example to yield a "new" boiler 1/2, and that new boiler is combined with the characteristic curves (or data) of boiler 3 to yield a resultant boiler 1/2/3, as was done in the example as described above relative to the emissions output and the example utilizing six boilers.

It would be obvious to one skilled in the art that the generation of the tables of FIG. 8 can be modified such that gas does not need to be included but a G/B ratio may be included, or may be implied from the tables since the first table of FIG. 8A is a 20/20% G/B ratio, table two is a 20/30% G/B ratio, . . . . Instead of generating the figures of 8B, the data of FIG. 8A may be directly inputted into the table of FIG. 8C with some additional columns or information implied, thereby eliminating the table of FIG. 8B. If none of the combinations for the total bark calculated above from the data contained in FIG. 8C is equal to 75 tons, then the closest value to 75 tons may be generated and that information may be outputted to the operator, as a recommended solution in the flow diagram of FIG. 2, step 115.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. A method for allocating a demanded amount of power to a plurality of power output apparatus, each power output apparatus having characteristic curves associated therewith, such that each of the power output apparatus supplies a portion of the demanded power wherein a total of the power outputted from the plurality of power output apparatus equals the amount of the demanded power, and such that the total power outputted from the plurality of power output apparatus results in a minimum cost for generating the demanded amount of power, and further wherein each boiler is allocated a quantity of waste fuel to be utilized in the generation of the demanded amount of power, the quantity of waste fuel utilized by all the power output apparatus over a predetermined time period being a predetermined total quantity of waste fuel, the method comprising the steps of:

a) entering characterization data for each of the power output apparatus into a controller, the data including cost, fuel, waste fuel, as a function of power output about each of the power output apparatus;

b) generating optimum solutions by parts for all possible valid output power demands, within output power bounds of each of the power output apparatus, the solutions indicating the portion of power each power output apparatus is to supply to provide the total power demanded at minimal cost, and also indicating waste fuel, fuel, waste fuel to fuel ratio, to be utilized during a predetermined plurality of time intervals within the predetermined time period;

c) storing the solutions in tables within a storage unit of the controller;

d) upon receipt of a demand for power, performing a search of the solution tables to obtain the amount of power each power output apparatus is to supply and to obtain the fuel and waste fuel each power output apparatus is to utilize, the total of the amounts of power from each power output apparatus being equal to the amount of power demanded at minimal cost, and the total amount of waste fuel utilized over the time period being the predetermined total quantity of waste fuel; and e) outputting control signals to each of the power output apparatus, the control signals being indicative of the amount of power to be supplied.

2. A method for allocating a demanded amount of power according to claim 1, wherein the number of power output apparatus is N, the step of generating solution by optimization by parts comprises the steps of:

a) combining characterization data of a first power output apparatus to characterization data of a second power output apparatus, the characterization data of the first and second power output apparatus including fuel and waste fuel;

b) when a plurality of predetermined power outputs combinations exits having the same total output as a result of the combining, selecting the predetermined power output combination from the first power output apparatus and the second power output apparatus in accordance with a predetermined criteria of the plurality of constraints which yields an optimal characterization of the first and second power output apparatus combination;

c) if N is greater than 2, combining characterization data of a next power output apparatus to the optimal characterization of the combination of the previous combining operation, otherwise proceeding to step (e);

d) repeating step (b) until all N power output apparatus have been optimally combined, thereby yielding an optimally combined combination of all N power output apparatus;

e) exiting the step of generating.

3. A method of allocating a demanded amount of power according to claim 2, further comprising the steps of:

combining all combinations of N power output apparatus omitting predetermined ones of the power output apparatus, thereby yielding a global allocation.

4. A method of allocating a demanded amount of power according to claim 3, wherein a first constraint is cost.

5. A method for allocating a demanded amount of power according to claim 4, wherein the controller is a process control system.

6. A method for allocating a demanded amount of power according to claim 5, wherein the control signals are set points.

7. A method for allocating a demanded amount of power according to claim 3, wherein the step of performing a search comprises the steps of:

a) upon receipt of a demand for power, performing a search of the solution tables to obtain the amount of power each power output apparatus is to supply, the total of the amounts of power from each power output apparatus being equal to the amount of power demanded at minimal cost and the amount of waste fuel and fuel to be utilized for the time interval such that the total amount of waste fuel utilized over the time period being the predetermined total quantity of waste fuel;

b) outputting the recommended solutions obtained from the solution tables;

c) waiting for an operator input to proceed; and d) if the operator input to proceed is not inputted, waiting for an operator input to supply manually selected allocations thereby overriding the recommended solutions.

8. A method for allocating a demanded amount of power according to Claim 7, further comprising the steps of:

a) monitoring the demanded amount of power; and b) if the amount of power demanded is changed, proceeding to step (a) of claim 7, otherwise proceeding to step (a) of claim 1.

9. A method for allocating a demanded amount of power according to claim 3, wherein the steps of combining are performed x-at-a-time, where x is equal to or greater than two (2).

10. A method for allocating a demanded amount of power according to claim 4, wherein the steps of combining are performed x-at-a-time, where x is equal to or greater than two (2).

* * * * *